(12) United States Patent
Pan et al.

(10) Patent No.: US 7,960,463 B2
(45) Date of Patent: Jun. 14, 2011

(54) TIRE TREADS INCLUDING ALUMINUM HYDROXYCARBONATE

(75) Inventors: Xiao-Dong Pan, Akron, OH (US); Pat Sadhukhan, Akron, OH (US)

(73) Assignee: Bridgestone Corporation (JP)

( * ) Notice: Subject to any disclaimer, the term of this patent is extended or adjusted under 35 U.S.C. 154(b) by 80 days.

(21) Appl. No.: 12/346,405

(22) Filed: Dec. 30, 2008

(65) Prior Publication Data

US 2010/0004371 A1 Jan. 7, 2010

Related U.S. Application Data

(60) Provisional application No. 61/017,945, filed on Dec. 31, 2007.

(51) Int. Cl.
*C08K 3/00* (2006.01)
*C08K 3/10* (2006.01)
*C08K 3/34* (2006.01)
*C08K 3/04* (2006.01)
*C04B 26/06* (2006.01)
*B60C 1/00* (2006.01)
*C01B 31/24* (2006.01)
*C01F 7/02* (2006.01)

(52) U.S. Cl. ........ 524/424; 524/437; 524/492; 524/495; 423/419.1; 423/629; 423/630

(58) Field of Classification Search .................. 524/424, 524/437; 423/419.1, 629, 630
See application file for complete search history.

(56) References Cited

U.S. PATENT DOCUMENTS

| | | | |
|---|---|---|---|
| 4,059,681 A * | 11/1977 | Hem et al. ................. | 423/420.2 |
| 4,622,167 A * | 11/1986 | Heath et al. ................. | 516/112 |
| 6,130,283 A | 10/2000 | Nippa et al. | |
| 6,242,522 B1 | 6/2001 | Ezawa et al. | |
| 6,512,038 B1 * | 1/2003 | Ladouce et al. .............. | 524/437 |
| 6,573,323 B2 | 6/2003 | Kikuchi et al. | |
| 6,610,261 B1 * | 8/2003 | Custodero et al. ............ | 423/127 |
| 2003/0119963 A1 * | 6/2003 | Nippa et al. .................. | 524/437 |
| 2009/0215947 A1 * | 8/2009 | Miyata .......................... | 524/424 |

FOREIGN PATENT DOCUMENTS

| | | |
|---|---|---|
| EP | 1277795 A2 | 1/2003 |
| WO | WO 02/46309 A1 | 6/2002 |

OTHER PUBLICATIONS

Product Bulletin: BARCROFT® 0250.*
HI-SILI® 190G and 190G-M.*
Scholtz, E.C., Feldkamp, J.R., White, J.L, Hem, S.L. Journal of Pharmaceutical Sciences, vol. 74, No. 4, p. 478, 1965.*
Europhys. Lett., 52 (5), pp. 551-556 (2000).
A. C. Lasaga, Kinetic Theory in the Earth Sciences, "Nucleation Theory", Princeton University Press, Princeton, New Jersey, 1998, p. 499.

* cited by examiner

*Primary Examiner* — Vasu Jagannathan
*Assistant Examiner* — Anthony H Sheh
(74) *Attorney, Agent, or Firm* — Meredith E. Hooker; Arthur M. Reginelli

(57) ABSTRACT

Particular embodiments are directed toward a rubber mixture comprising (i) a rubber; and (ii) a filler component, where the filler component includes a filler selected from the group consisting of amorphous aluminum hydroxycarbonate, amorphous aluminum hydroxyoxycarbonate, and amorphous aluminum oxycarbonate, where said amorphous aluminum hydroxycarbonate, amorphous aluminum hydroxyoxycarbonate, and amorphous aluminum oxycarbonate are characterized by a BET specific surface area of less than 40 $m^2/g$.

9 Claims, No Drawings

TIRE TREADS INCLUDING ALUMINUM HYDROXYCARBONATE

This invention claims the benefit of U.S. Provisional Application Ser. No. 61/017,945, filed on Dec. 31, 2007, which is incorporated herein by reference.

FIELD OF THE INVENTION

One or more embodiments of the present invention are directed toward tire treads including aluminum hydroxycarbonate. The tire treads provide tires demonstrating advantageous wet skid performance.

BACKGROUND OF THE INVENTION

Tires bearing rubber tread have been used for over one century. Wet traction performance of a tire is highly desirable. Due to the many complex factors involved, such as deformation of tread rubber induced by road surface asperities, rate of water drainage between tread rubber and road surface, and possible adhesive interactions at the interface between rubber and road, a quantitative mechanistic understanding of wet traction suitable for rational design of tread compounds is currently absent. Thus, in the pursuit of new rubber materials for further improvement of tire wet performance, scientists and engineers are continuing to seek better physical understanding on different contributing factors to wet traction.

There exist several contributing factors to the total sliding friction of rubber compounds on a wet rough surface. It is believed that a major contribution comes from the hysteretic loss during the high frequency bulk deformation of rubber compounds induced by the multi-scale asperities on the road surface. Conventionally, loss tangent (tan $\delta$) measured at 0° C. (or at some low temperature) and at an appropriate frequency has been employed as the predictor to rank the contribution from this source. It is also likely that adhesion at the interface between rubber compounds and road surface further enhances wet skid resistance. With this in mind, it may be desirable to increase the adhesion between filler particles exposed on rubber surface and the road surface. For the ideal case of one single spherical filler particle in static contact with a perfectly smooth flat surface in water, Europhys. Lett. 52 (5) 551-556 by Papastavrou et al teaches that the adhesion force may be given by the formula $$F_{adhesion} = 3/2\pi R W_{FillerWaterRoad}$$

where R is the radius of the sphere and $W_{FillerWaterRoad}$ is the work of adhesion:

$$W_{FillerWaterRoad} = \gamma_{FillerWater} + \gamma_{RoadWater} - \gamma_{FillerRoad}$$

where $\gamma_{FillerWater}$ is the surface free energy of filler particle in water, $\gamma_{RoadWater}$ is the interfacial free energy of road surface in water, and $\gamma_{FillerRoad}$ is the interfacial energy between filler and road surface. It is believed that a high pressure is necessary to bring the filler particle into direct contact with the road surface.

Therefore, one possibility of increasing adhesion between filler particles on the rubber compound surface and road surface is to choose filler particles exhibiting high $\gamma_{FillerWater}$. It is generally known that $\gamma_{FillerWater}$ is significantly higher for a particle in crystalline phase than that for a particle in amorphous phase as suggested by Lasaga in *Kinetic Theory in the Earth Sciences* (1998)

U.S. Pat. No. 6,512,038 teaches rubber compositions including amorphous aluminum hydroxycarbonate, amorphous aluminum hydroxyoxycarbonate, or amorphous aluminum oxycarbonate. These compositions can be used in the manufacture of tire treads. The amorphous aluminum fillers generally have a BET specific surface area of between 40 and 150 $m^2/g$. The amorphous aluminum filler is preferably employed in lieu of precipitated silica filler, although it may be used in conjunction with a minor amount of precipitated silica. No mention is made of carbon black as a reinforcing filler. The Examples show higher tan $\delta$ at 0° C. than the comparative without the amorphous aluminum filler, and also shows higher tan $\delta$ at 0° C., thereby suggesting better wet traction, when the amorphous aluminum filler has a larger BET specific surface area (75 $m^2/g$ yielding higher tan $\delta$ at 0° C. than 58 $m^2/g$). It is known in rubber industry that when different types of fillers are employed for rubber compounding, such as using precipitated silica to replace carbon black, the conventional predictor tan $\delta$ at 0° C. fails to rank the actual wet skid resistance of rubber compounds.

SUMMARY OF THE INVENTION

One or more embodiments of the present invention provide a rubber mixture comprising (i) a rubber; and (ii) a filler component, where the filler component includes a filler selected from the group consisting of amorphous aluminum hydroxycarbonate, amorphous aluminum hydroxyoxycarbonate, and amorphous aluminum oxycarbonate, where said amorphous aluminum hydroxycarbonate, amorphous aluminum hydroxyoxycarbonate, and amorphous aluminum oxycarbonate are characterized by a BET specific surface area of less than 40 $m^2/g$.

Still other embodiments provide a rubber mixture comprising (i) a rubber; and (ii) a filler component, where the filler component includes an aluminum hydroxycarbonate defined by the formula $Al(OH)_x(CO_3)_y \cdot zH_2O$, where $0.5 \leq x \leq 3$, $0.25 < y \leq 0.4$; $z \leq 1.5$.

Still other embodiments provide a rubber mixture comprising (i) a rubber; and (ii) a filler component, where the filler component includes an aluminum hydroxycarbonate, where the molar ratio of carbonate to aluminum is greater than 0.25.

DETAILED DESCRIPTION OF ILLUSTRATIVE EMBODIMENTS

One or more embodiments of the present invention are directed toward tires including a tire tread that includes reinforcing filler and an aluminum hydroxycarbonate selected from the group consisting of amorphous aluminum hydroxycarbonate, amorphous aluminum hydroxyoxycarbonate, and amorphous aluminum oxycarbonate. It has unexpectedly been discovered that the use of aluminum hydroxycarbonate having a BET specific surface area of less than 40 $m^2/g$, in combination with reinforcing filler, provides an overall balance of advantageous properties including improved wet traction as determined by using a portable British pendulum skid tester.

The tire treads of one or more embodiments of the present invention are prepared from rubber mixtures or formulations that include a rubber component, a filler component, a curative, and optional ingredients that may be conventional in the art.

In one or more embodiments, the rubber component includes those polymers that are conventionally employed in the art of making tires, and in particular embodiments tire treads. In one or, more embodiments, these polymers include elastomers, which include those polymers that are capable of being vulcanized into vulcanizates exhibiting elastomeric properties.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Specifically included are high cis-polybutadienes including those prepared with coordination catalyst systems such as nickel and lanthanide-based systems. Various elastomers can be utilized in oil-extended form.

In one or more embodiments, the elastomer may include functionalized elastomers. In one or more embodiments, functionalized elastomers, which may also be referred to as functionalized polymers, may include any synthetic or natural rubber including one or multiple functional group(s). Functional groups may be introduced during initiation and/or termination of polymerization, during polymerization, during chain transfer, or during post-polymerization modification. The functionalized polymer may include one or more functional groups at or near one or both termini, or along the backbone of the polymer.

The polymer to which the functional group is attached may include a rubbery polymer as described above. The functional group may be tethered or attached to the polymer at the head and/or tail of the polymer, and in certain embodiments may be pendant to the polymer chain. Functional polymers may include multiple functional groups including head and tail functionalization. As those skilled in the art appreciate, head functionalization refers to the presence of a functional group at or near the location of initiation of the polymer, and tail functionalization refers to the presence of a functional group at or near the location of termination of the polymer.

In one or more embodiments, functional groups include those substituents that reduce the 50° C. hysteresis loss of a carbon black-filled vulcanizate prepared from the functionalized polymer as compared to similar carbon black-filled vulcanizates prepared from polymers without the functional group. In one or more embodiments, this reduction in hysteresis loss is at least 5%, in other embodiments at least 10%, and in other embodiments at least 15%. In other embodiments, functional groups include those groups that will have a similar impact on silica-filled, mixed carbon black/silica-filled, mixed carbon black/mineral particles-filled, mixed silica/mineral particles-filled, or mineral particles-filled compositions.

In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, boron-containing groups, oxygen-containing groups, phosphorous-containing groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary oxygen-containing groups include carbonyl-containing groups, oxygen-containing and azaheterocycle.

The filler component of the rubber mixture includes (i) an aluminum hydroxycarbonate selected from the group consisting of amorphous aluminum hydroxycarbonate, amorphous aluminum hydroxyoxycarbonate, and amorphous aluminum oxycarbonate and (ii) a reinforcing filler. The aluminum hydroxycarbonate may be referred to as a porous aluminum hydroxycarbonate, amorphous aluminum filler, or amorphous aluminum hydroxycarbonate.

In one or more embodiments, the aluminum hydroxycarbonate includes at least 0.01 mole, and in other embodiments at least 0.04 mole, and in other embodiments at least 0.1 mol of carbonate per mole of aluminum. In one or more embodiments, the carbonate/aluminum molar ratio is at most 0.25, and in other embodiments at most 0.2. In one or more embodiments, the carbonates present in the amorphous aluminum filler that can be detected by infrared spectroscopy are usually covalent. In other embodiments, the carbonate/aluminum molar ratio is greater than 0.25, in other embodiments greater than 0.26, in other embodiments greater than 0.27, and in other embodiments greater than 0.3. In these or other embodiments, the carbonate/aluminum molar ratio is less than 0.5, in other embodiments less than 0.45, and in other embodiments less than 0.4. In one or more embodiments, the carbonates present in the amorphous aluminum filler that can be detected by infrared spectroscopy are usually covalent.

In one or more embodiments, the aluminum hydroxycarbonate is characterized by a BET specific surface area of less than 40 $m^2/g$, in other embodiments less than 38 $m^2/g$, in other embodiments less than 36 $m^2/g$, in other embodiments less than 34 $m^2/g$, in other embodiments less than 32 $m^2/g$, in other embodiments less than 30 $m^2/g$, in other embodiments less than 28 $m^2/g$, and in other embodiments less than 26 $m^2/g$. In these or other embodiments, aluminum hydroxycarbonate is characterized by a BET specific surface area of at least 10 $m^2/g$, in other embodiments at least 12 $m^2/g$, and in other embodiments at least 18 $m^2/g$. The BET surface area can be determined according to the Brunauer-Emmet-Teller method described in "The Journal of the American Chemical Society", Vol. 60, page 309, February 1938, which corresponds to NF Standard T 45007 (November 1987).

Useful aluminum hydroxycarbonates are commercially available. For example, amorphous aluminum hydroxycarbonates having a BET specific surface area of about 27 $m^2/g$ is commercially available under the tradename Barcroft 0250 ™ ('dried aluminum hydroxide gel' from SPI Pharma, Inc; Delaware), and amorphous aluminum hydroxycarbonates having a BET specific surface area of about 35 $m^2/g$ is commercially available under the tradename Barcroft 0325™ (SPI Pharma).

In one or more embodiments, the aluminum hydroxycarbonates employed in this invention may be defined by the formula $Al(OH)_x(CO_3)_y \cdot zH_2O$, where $0.5 \leq x \leq 3$, $0.01 \leq y \leq 0.4$; $z \leq 1.5$. In one or more embodiments, O:x+3y+z, $0.53 \leq x+3y+z \leq 5.25$; H:x+2z, $0.5 \leq 2+2z \leq 6$; C:y, $0.01 \leq 7 \leq 0.25$. In one or more embodiments, z is less than 1.5, in other embodiments less than 1.0, in other embodiments less than 0.5, and in other embodiments less than 0.1. In one or more embodiments, y is $\leq 0.3$, and in other embodiments $\leq 0.25$. In yet other embodiments, y is greater than 0.25, in other embodiments greater than 0.3, and in other embodiments from about 0.26 to about 0.4.

Other characteristics of potentially useful aluminum hydroxycarbonates are disclosed in U.S. Pat. No. 6,512,038, which is incorporated herein by reference.

In one or more embodiments, reinforcing filler includes carbon black, silica, or a mixture of carbon black and silica.

In one or more embodiments, the carbon black includes those carbon black grades generally employed in the practice of making tires, and in particular embodiments tire treads. These carbon black compounds include those characterized by ASTM D 1765. In one or more embodiments, the carbon black is characterized by a an iodine adsorption number, per ASTM D1510, of at least 80 g/kg, in other embodiments at least 90 g/kg, in other embodiments at least 100 g/kg, in other embodiments at least 110 g/kg, in other embodiments at least 120 g/kg. The carbon black also includes silica-modified carbon black (so-called carbon-silica dual phase filler from Cabot Corporation).

In one or more embodiments, the silica (which may also be referred to as amorphous silicon dioxide) includes precipitated silica from wet processes or fumed silica from combustion process. In one embodiment, silicas have a surface area, as measured by the BET method, of about 32 to about 400 m$^2$/g, in another embodiment about 100 to about 250 m$^2$/g, and in yet another embodiment about 150 to about 220 m$^2$/g. In certain embodiments the pH of the silica filler is about 5.5 to about 7 and preferably about 5.5 to about 6.8. Commercially available silicas include Hi-Sil™ 215, Hi-Sil™ 233, Hi-Sil™ 255LD, and Hi-Sil™ 190G (PPG Industries; Pittsburgh, Pa.), ZeoSil™ 1165MP and 175GRPlus (Rhodia), Vulkasil™ S/kg (Lanxess AG), Ultrasil™ VN2, VN3 (Degussa), and HuberSil™ 8745 (Huber).

A multitude of rubber curing agents may be employed, including sulfur or peroxide-based curing systems. Curing agents are described in 20 *Kirk-Othmer, Encyclopedia of Chemical Technology*, 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, silane coupling agents, zinc oxide, tackifying resins, reinforcing resins, fatty acids such as stearic acid, peptizers, and one or more additional rubbers.

In one or more embodiments, the rubber mixtures employed to make tire treads according to one or more embodiments of the present invention may include at least 40 parts by weight (pbw) per 100 parts by weight rubber (phr), in other embodiments at least 60 pbw phr, in other embodiments at least 70 pbw phr, in other embodiments at least 80 pbw phr, in other embodiments at least 90 pbw phr of filler. In these or other embodiments, the rubber mixtures may include less than 240 pbw phr, in other embodiments less than 180 pbw phr, in other embodiments less than 150 pbw phr, in other embodiments less than 120 pbw phr, and in other embodiments less than 110 pbw phr filler.

In one or more embodiments, at least 5% of the filler volume within the filler mixture (i.e. volume fraction) includes the amorphous aluminum filler (i.e., the aluminum hydroxycarbonate described above). In other embodiments, at least 10%, in other embodiments at least 20%, in other embodiments at least 30%, and in other embodiments at least 45% of the filler volume includes amorphous aluminum filler, with the balance including reinforcing filler (e.g. carbon black and/or silica). In these or other embodiments less than 80%, in other embodiments less than 60%, in other embodiments less than 55%, in other embodiments less than 50%, in other embodiments less than 45%, and in other embodiments less than 40% of the filler volume includes amorphous aluminum filler with the balance including reinforcing filler (e.g. carbon black and/or silica).

In one or more embodiments, the rubber mixtures includes at least 10 pbw phr, in other embodiments at least 20 pbw phr, in other embodiments at least 30 pbw phr, and in other embodiments at least 35 pbw phr carbon black. In these or other embodiments, the rubber mixtures include less than 100 pbw phr, in other embodiments less than 80 pbw phr, in other embodiments less than 60 pbw phr, and in other embodiments less than 50 pbw phr carbon black or silica.

In one or more embodiments, vulcanizable compositions can be prepared using the aluminum hydroxycarbonate of this invention by employing conventional mixing techniques. In other embodiments, the preparation of the vulcanizable composition of this invention may be altered to achieve certain desirable attributes afforded by practice of this invention. Likewise, the construction and curing of tires from the vulcanizable compositions of this invention may be performed using conventional techniques. In other embodiments, the techniques may be altered based upon the advantageous attributes provided by practice of the present invention.

In one or more embodiments, the rubber mixture may be prepared by forming an initial masterbatch that includes the rubber component and filler. The initial masterbatch may include both the amorphous aluminum filler and the reinforcing filler. This initial masterbatch may be mixed at a starting temperature of from about 25° C. to about 135° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the amorphous aluminum filler and the reinforcing filler can be added during these remills. Rubber compounding techniques and the additives employed therein are generally known as disclosed in Stephens, *The Compounding and Vulcanization of Rubber*, in *Rubber Technology* (2$^{nd}$ Ed. 1973).

As is known in the art, coupling and shielding agents may be employed. These coupling and/or shielding agents may be employed in conjunction with use of the aluminum hydroxycarbonate of the present invention in the absence of silica filler. Or, in other embodiments, these coupling and shielding agents may be employed in conjunction with the use of silica as a reinforcing filler. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. Typically, special mixing procedures may be employed when silane coupling agent is employed as is known in the art.

The rubber mixtures, which may also be referred to as vulcanizable rubber compositions or stocks, can be used to make a variety of tire components, but are particularly useful for forming tire treads. The vulcanizable rubber compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to 180° C. Cured or crosslinked rubber compositions may be referred to as vulcanizates, which generally contain three-dimensional polymeric networks that are thermoset. The amorphous aluminum filler, reinforcing filler, and other ingredients, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

Despite the fact that conventional wisdom would suggest that crystalline particles would better contribute to wet skid resistance, the opposite has been unexpectedly discovered. Rubber formulations with aluminum hydroxycarbonate particles (of relatively low BET surface area) in amorphous phase (also called 'dried aluminum hydroxide gel') can actually result in wet skid resistance significantly higher than that for a rubber compound filled with similar amount of aluminum hydroxide in crystalline phase. In addition, it is believed that amorphous aluminum hydroxycarbonates of low BET surface area are porous particles bearing pores of sufficiently large size that may facilitate water drainage between rubber and the wet road surface.

In order to demonstrate the practice of the present invention, the following examples have been prepared and tested. The examples should not, however, be viewed as limiting the scope of the invention. The claims will serve to define the invention.

EXAMPLES

Samples 1-6

Six rubber mixtures were prepared within a 300-gram Brabender internal mixer. A three stage mixing procedure was employed whereby the rubber, filler, wax, stearic acid, and antioxidant where initially mixed. This masterbatch was dropped and allowed to cool. The mixture was then remilled. The cure package was then added to the mixture and mixing continued. The recipe used for each sample is provided in Table I. The rubber that was employed was a poly(styrene-co-butadiene) rubber extended with 37.5 phr of aromatic oil. Its mid-point glass transition temperature via differential scanning calorimetry is at about −30° C.

TABLE I

| Mix Stage | Ingredient | 1 | 2 | 3 | 4 | 5 | 6 |
|---|---|---|---|---|---|---|---|
| | | | | Comparative | | | Invention |
| Master batch | Rubber | 137.5 | 137.5 | 137.5 | 137.5 | 137.5 | 137.5 |
| | Carbon Black N234 | 70 | 35 | 35 | 35 | 35 | 35 |
| | Carbon Black N990 | 0 | 35 | 0 | 0 | 0 | 0 |
| | Crystalline Higilite H-43m | 0 | 0 | 47.06 | 0 | 0 | 0 |
| | Crystalline PGA-HD | 0 | 0 | 0 | 47.06 | 0 | 0 |
| | Barcroft 0200 dried gel | 0 | 0 | 0 | 0 | 47.06 | 0 |
| | Barcroft 0250 dried gel | 0 | 0 | 0 | 0 | 0 | 47.06 |
| | Wax | 1.5 | 1.5 | 1.5 | 1.5 | 1.5 | 1.5 |
| | Stearic acid | 2 | 2 | 2 | 2 | 2 | 2 |
| | Antioxidant | 0.95 | 0.95 | 0.95 | 0.95 | 0.95 | 0.95 |
| Remill | | | | | | | |
| Final batch | ZnO | 2 | 2 | 2 | 2 | 2 | 2 |
| | MBTS | 0.2 | 0.2 | 0.2 | 0.2 | 0.2 | 0.2 |
| | TBBS | 0.8 | 0.8 | 0.8 | 0.8 | 0.8 | 0.8 |
| | TMTM | 0.2 | 0.2 | 0.2 | 0.2 | 0.2 | 0.2 |
| | Sulfur | 1.7 | 1.7 | 1.7 | 1.7 | 1.7 | 1.7 |

TABLE II

| | | | Manufacturer's data | | Measured |
|---|---|---|---|---|---|
| Aluminum hydroxide | State of structure | Source | Mean diameter (μm) | BET surface area ($m^2/g$) | BET surface area ($m^2/g$) |
| Higilite H-43m | Crystalline (gibbsite) | Showa Denko in Japan | 0.75 | 6.7 | |
| Hydral PGA-DG | Crystalline (gibbsite) | Almatis | 1.0 | 4.0-5.2 | 5.0 |
| Barcroft 0200 dried gel | amorphous | SPI Pharma | Not provided | 85-100 | 128.5 |
| Barcroft 0250 dried gel | amorphous | SPI Pharma | Not provided | 35-45 | 27.4 |
| Barcroft 0300 dried gel | amorphous | SPI Pharma | Not provided | 75-100 | 123.4 |
| Barcroft 0325 dried gel | amorphous | SPI Pharma | Not provided | 35-60 | 34.7 |

Table II provides the characteristics of the aluminum hydroxycarbonates that were employed. The rubber mixtures were formed into test samples and cured to reach a desirable cure level. The vulcanizates were then subjected to various tests, and the results of some of the testing is provided in Table III.

TABLE III

|  | Example 1 | Example 2 | Example 3 | Example 4 | Example 5 | Example 6 |
|---|---|---|---|---|---|---|
| Cure Test At 171° C. For 45 min | | | | | | |
| ML (dN · m) | 2.55 | 1.34 | 1.18 | 1.27 | 2.71 | 1.47 |
| MH (dN · m) | 12.93 | 9.25 | 7.58 | 7.97 | 11.72 | 9.05 |
| t90 (min) | 5.61 | 5.81 | 8.62 | 7.62 | 17.73 | 4.88 |
| Tensile at RT | | | | | | |
| Mod50% (MPa) | 1.557 | 0.945 | 0.782 | 0.907 | 1.124 | 0.916 |
| Mod100% (MPa) | 2.696 | 1.596 | 1.105 | 1.395 | 1.749 | 1.363 |
| Mod300% (MPa) | 12.18 | 6.962 | 3.489 | 4.327 | 6.072 | 4.248 |
| Tensile Strength at Break (MPa) | 23.2 | 15.4 | 13.7 | 14.5 | 17.5 | 13.5 |
| Elongation at Break (%) | 511.1 | 535.3 | 625.4 | 612 | 580 | 586.9 |
| TempSwp 5 Hz | | | | | | |
| T at peak tanδ (° C.) | −14.2 | −13.97 | −14.02 | −13.89 | −13.96 | −13.83 |
| Peak in tanδ | 0.598 | 0.968 | 1.033 | 1.071 | 0.865 | 1.057 |
| StrainSwp | | | | | | |
| G' at 10 Hz 60° C. 8.0% (MPa) | 2.339 | 1.418 | 1.376 | 1.471 | 1.826 | 1.516 |
| Tanδ at 10 Hz 60° C. 8.0% | 0.293 | 0.201 | 0.208 | 0.207 | 0.219 | 0.203 |
| G' at 10 Hz 0° C. 8.0% (MPa) | 7.26 | 4.13 | 3.91 | 4.11 | 4.82 | 4.12 |
| Tanδ at 10 Hz 0° C. 8.0% | 0.729 | 0.717 | 0.731 | 0.724 | 0.662 | 0.689 |
| G' at 1 Hz-12° C. 8.0% (MPa) | 12.71 | 6.81 | 6.372 | 6.769 | 7.488 | 6.656 |
| Tanδ at 1 Hz-12° C. 8.0% | 1.102 | 1.183 | 1.188 | 1.188 | 1.045 | 1.109 |
| BPN index | 100.0 | 103.2 | 117.7 | 116.3 | 116.7 | 128.8 |

Tensile mechanical properties were measured using ASTM D-412 at 25° C. with Din die-cut samples (dumbbell shaped), with a sample thickness of about 1.9 mm, stretched at the rate of 508 mm/min. Dynamic temperature sweep testing was done with an ARES (Advanced Rheometric Expansion System) from TA Instruments at 5 Hz, strain amplitude at 0.2% from −50 to −8° C. & at 2.0% from −3 to 80° C. Dynamic strain sweep testing was done with an ARES-HT (high torque) at 1 or 10 Hz and various temperatures between strain of 0.25% and 15%.

Skid resistance on a wet concrete surface was tested with a portable British pendulum skid tester (manufactured by W. F. Stanley Ltd.) and was expressed by an index (BPN Index) on the basis of Example 1 as the control of 100. The greater the index value, the better the wet skid resistance.

Samples 7-17

Eleven additional samples were prepared in a manner similar to those samples prepared above. A commercial silane coupling agent obtained under the tradename Si 69 (Degussa) was added to some of the compounds during the remill stage of mixing. Some additional amount of aluminum hydroxycarbonate was also added during remill for more rigorous compensation of any obvious loss from master batch mixing. The samples were tested for wet skid resistance on a different worn concrete surface with a portable British pendulum skid tester as performed above. The rubber formulation recipes and the results of physical testing are set forth in Table IV and Table V, respectively.

TABLE IV

| | | Samples | | | | | | | | | | |
|---|---|---|---|---|---|---|---|---|---|---|---|---|
| | | 7 | 8 | 9 | 10 | 11 | 12 | 13 | 14 | 15 | 16 | 17 |
| | | | | | | Comparative | | | | | Invention | |
| Master Batch | SBR (Oil-extended) | 137.5 | 137.5 | 137.5 | 137.5 | 137.5 | 137.5 | 137.5 | 137.5 | 137.5 | 137.5 | 137.5 |
| | Carbon Black (N234) | 70 | 35 | 35 | 35 | 35 | 35 | 35 | 35 | 35 | 35 | 35 |
| | Carbon Black (N990) | 0 | 35 | 0 | 0 | 0 | 0 | 0 | 0 | 0 | 0 | 0 |
| | Crystalline Higilite H-43m | 0 | 0 | 47.06 | 0 | 0 | 47.06 | 0 | 0 | 0 | 0 | 0 |
| | Crystalline PGA-HD | 0 | 0 | 0 | 0 | 0 | 0 | 47.06 | 0 | 0 | 0 | 0 |
| | Barcroft 0200 Dried Gel | 0 | 0 | 0 | 47.06 | 0 | 0 | 0 | 47.06 | 0 | 0 | 0 |
| | Barcroft 0300 Dried Gel | 0 | 0 | 0 | 0 | 0 | 0 | 0 | 0 | 47.06 | 0 | 0 |
| | Barcroft 0250 Dried Gel | 0 | 0 | 0 | 0 | 47.06 | 0 | 0 | 0 | 0 | 47.06 | 0 |
| | Barcroft 0325 Dried Gel | 0 | 0 | 0 | 0 | 0 | 0 | 0 | 0 | 0 | 0 | 47.06 |
| | Wax | 1.5 | 1.5 | 1.5 | 1.5 | 1.5 | 1.5 | 1.5 | 1.5 | 1.5 | 1.5 | 1.5 |
| | Stearic Acid | 2 | 2 | 2 | 2 | 2 | 2 | 2 | 2 | 2 | 2 | 2 |
| | AO6-PPD | 0.95 | 0.95 | 0.95 | 0.95 | 0.95 | 0.95 | 0.95 | 0.95 | 0.95 | 0.95 | 0.95 |

TABLE IV-continued

| | | Samples | | | | | | | | | | |
|---|---|---|---|---|---|---|---|---|---|---|---|---|
| | | 7 | 8 | 9 | 10 | 11 | 12 | 13 | 14 | 15 | 16 | 17 |
| | | | | | | Comparative | | | | | Invention | |
| Remill | Liquid Silane (Si 69) | 0 | 0 | 0 | 0 | 0 | 2.69 | 2.69 | 2.69 | 2.69 | 2.69 | 2.69 |
| Final Batch | ZnO | 2 | 2 | 2 | 2 | 2 | 2 | 2 | 2 | 2 | 2 | 2 |
| | MBTS | 0.2 | 0.2 | 0.2 | 0.2 | 0.2 | 0.2 | 0.2 | 0.2 | 0.2 | 0.2 | 0.2 |
| | TBBS | 0.8 | 0.8 | 0.8 | 0.8 | 0.8 | 0.8 | 0.8 | 0.8 | 0.8 | 0.8 | 0.8 |
| | TMTM | 0.2 | 0.2 | 0.2 | 0.2 | 0.2 | 0.2 | 0.2 | 0.2 | 0.2 | 0.2 | 0.2 |
| | Sulfur | 1.7 | 1.7 | 1.7 | 1.7 | 1.7 | 1.7 | 1.7 | 1.7 | 1.7 | 1.7 | 1.7 |

TABLE V

| | Samples | | | | | | | | | | |
|---|---|---|---|---|---|---|---|---|---|---|---|
| | 7 | 8 | 9 | 10 | 11 | 12 | 13 | 14 | 15 | 16 | 17 |
| | | | | | Comparative | | | | | Invention | |
| Tensile at RT | | | | | | | | | | | |
| Mod50% (MPa) | 1.508 | 0.813 | 0.774 | 1.285 | 0.649 | 0.809 | 0.914 | 1.534 | 1.608 | 0.954 | 1.076 |
| Mod100% (MPa) | 2.627 | 1.53 | 1.199 | 1.927 | 1.027 | 1.423 | 1.613 | 2.358 | 2.428 | 1.684 | 1.874 |
| Mod300% (MPa) | 12.044 | 7.634 | 4.711 | 6.306 | 3.974 | 5.947 | 6.003 | 7.937 | 7.716 | 5.968 | 6.175 |
| Tensile at Break (MPa) | 21.6 | 17.8 | 17.3 | 14.9 | 12.5 | 17.7 | 15.4 | 18.3 | 18.3 | 15.0 | 13.5 |
| Elongation at Break (%) | 534.4 | 584.3 | 638.7 | 558.0 | 562.1 | 599.5 | 552.4 | 617.8 | 567.4 | 539.5 | 497.8 |
| StrainSwp | | | | | | | | | | | |
| G' at 15 Hz - 12° C. 10.2% (MPa) | 2.07 | 1.3 | 1.39 | 3.24 | 1.38 | 1.44 | 1.54 | 2.99 | 2.73 | 1.54 | 1.58 |
| Tanδ at 15 Hz 50° C. 10.2% | 0.33 | 0.223 | 0.212 | 0.24 | 0.212 | 0.192 | 0.19 | 0.248 | 0.27 | 0.191 | 0.192 |
| G' at 1 Hz - 12° C. 6.2% (MPa) | 14.8 | 7.46 | 7.41 | 17.5 | 6.85 | 7.55 | 7.86 | 16.4 | 15.2 | 7.36 | 7.35 |
| Tanδ at 1 Hz - 12° C. 6.2% | 1.16 | 1.27 | 1.23 | 1.05 | 1.16 | 1.24 | 1.23 | 1.03 | 0.999 | 1.16 | 1.16 |
| BPN Index | 100.0 | 101.7 | 112.5 | 103.8 | 115.7 | 111.5 | 110.8 | 104.3 | 103.7 | 115.1 | 115.1 |

Various modifications and alterations that do not depart from the scope and spirit of this invention will become apparent to those skilled in the art. This invention is not to be duly limited to the illustrative embodiments set forth herein.

What is claimed is:

1. A rubber mixture comprising:
   (i) a rubber; and
   (ii) a filler component, where the filler component includes a reinforcing filler selected from the group consisting of carbon black, silica, and a mixture of carbon black and silica, and a filler selected from the group consisting of amorphous aluminum hydroxycarbonate, amorphous aluminum hydroxyoxycarbonate, and amorphous aluminum oxycarbonate, where said amorphous aluminum hydroxycarbonate, amorphous aluminum hydroxyoxycarbonate, and amorphous aluminum oxycarbonate are characterized by a BET specific surface area of less than 38 m$^2$/g.

2. The rubber mixture of claim 1, where said amorphous aluminum hydroxycarbonate, amorphous aluminum hydroxyoxycarbonate, and amorphous aluminum oxycarbonate are characterized by a BET specific surface area of less than 36 m$^2$/g.

3. The rubber mixture of claim 1, where said amorphous aluminum hydroxycarbonate, amorphous aluminum hydroxyoxycarbonate, and amorphous aluminum oxycarbonate are characterized by a BET specific surface area of less than 34 m$^2$/g.

4. The rubber mixture of claim 1, where the mixture includes at least 5 pbw phr and less than 120 pbw phr of the filler component.

5. The rubber mixture of claim 1, where the mixture includes at least 10 pbw phr and less than 90 pbw phr of the filler component.

6. The rubber mixture of claim 4, where the volume of the filler component includes at least 5% and less than 80% of a filler selected from the group consisting of amorphous aluminum hydroxycarbonate, amorphous aluminum hydroxyoxycarbonate, and amorphous aluminum oxycarbonate.

7. The rubber mixture of claim 4, where the volume of the filler component includes at least 10% and less than 70% of a filler selected from the group consisting of amorphous aluminum hydroxycarbonate, amorphous aluminum hydroxyoxycarbonate, and amorphous aluminum oxycarbonate.

8. A rubber mixture comprising:
   (i) a rubber; and
   (ii) a filler component, where the filler component includes a reinforcing filler and an aluminum hydroxycarbonate defined by the formula $Al(OH)_x(CO_3)_y \cdot z(H_2O)$, where $0.5 \leq x \leq 3$, $0.25 < y \leq 0.4$, $z \leq 1.5$, where said aluminum hydroxycarbonate is characterized by a BET specific surface area of less than 38 m$^2$/g.

9. A rubber mixture comprising:
   (i) a rubber; and
   (ii) a filler component, where the filler component includes a reinforcing filler and an aluminum hydroxycarbonate, where the molar ratio of carbonate to aluminum is greater than 0.25 and said aluminum hydroxycarbonate is characterized by a BET specific surface area of less than 38 m$^2$/g.

* * * * *